Nov. 16, 1965 J. E. BACON ETAL 3,218,494

ALTERNATING CURRENT GENERATOR

Filed Jan. 3, 1963 2 Sheets-Sheet 1

INVENTORS
JOHN E. BACON
RICHARD G. JEWELL
BY Richard E. Hosley

THEIR ATTORNEY

Nov. 16, 1965   J. E. BACON ETAL   3,218,494
ALTERNATING CURRENT GENERATOR
Filed Jan. 3, 1963   2 Sheets-Sheet 2

INVENTORS
JOHN E. BACON
RICHARD G. JEWELL
BY
THEIR ATTORNEY

United States Patent Office 3,218,494
Patented Nov. 16, 1965

3,218,494
ALTERNATING CURRENT GENERATOR
John E. Bacon, Peabody, and Richard G. Jewell, Swampscott, Mass., assignors to General Electric Company, a corporation of New York
Filed Jan. 3, 1963, Ser. No. 249,250
3 Claims. (Cl. 310—156)

The present invention relates to dynamoelectric machines and more particularly to an alternating current generator for producing high-frequency alternating current power.

Alternating current generators of the type utilizing a permanent field magnet in the rotor to eliminate the need for slip rings are widely used on aircraft and elsewhere as tachometer generators because of their simplicity, dependability, and rugged construction. Such tachometer generators are used to energize speed indicators or tachometers and are satisfactory for this purpose because only a small amount of electrical power is required. With the advent of jet-engine-powered aircraft with critically important electrically operated fuel control systems for the jet engines, there exists a need for a separate alternating current power source having the reliability and dependability of a tachometer generator, and tachometer-type generators have been used for this purpose. However, to obtain the required amount of power for some applications to operate such fuel control systems utilizing conventional tachometer generator construction, the size of the generator must be increased to the point where the resulting design is unacceptable or at least undesirable because of the large size and weight involved.

Accordingly, it is an object of the present invention to provide an improved alternating current generator having the reliability of the conventional tachometer generator but which has substantially higher power output without a corresponding increase of size and weight.

Another object of the invention is to provide an alternating current generator which is highly reliable, has a very simple mechanical and electrical design, and which has a high power-to-weight ratio.

A further object of the invention is to provide an alternating current generator having a high frequency output which permits rectification to direct current needed in electronic control circuits with minimum size filter capacitors.

Further objects and advantages of the invention will become apparent as the following description proceeds.

Briefly, in accordance with the illustrated embodiment of the invention, an alternating current generator is provided having a rotor with two permanent magnets producing magnetic flux linking a stator output winding surrounding the rotor. The rotor and stator have a magnetic structure establishing a plurality of peripheral paths for magnetic flux from the magnets to circulate between the rotor and stator, parts of the flux paths being common to both magnets thereby reducing the weight of the structure. Alternative flux paths are provided in part of the magnetic circuit so arranged that when the flux passes through the first path, the magnetic flux from the first magnetic links the output winding in one direction and the magnetic flux from the second magnet is bypassed around the winding; and when the magnetic flux is switched through the second path, the flux from the second magnet links the output winding in the opposite direction and the flux from the first magnet is bypassed around the output winding. In order to switch the magnet flux between the alternative paths during rotation of the rotor and thereby generate voltage by reversing the direction of the magnetic flux linking the output winding, two sets of staggered rotor teeth are utilized which coact with two sets of aligned stator teeth located on opposite sides of the output winding as will be clear from the following detailed description.

For a better understanding of the invention, reference should be made to the following detailed description taken in connection with the accompanying drawings in which.

Figure 2:
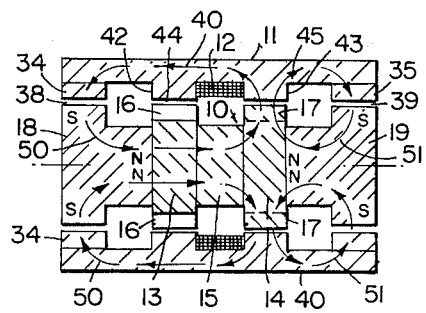
FIGURE 2 is a schematic sectional view of the generator showing the direction of the magnetic flux paths linking the two rotor magnets and the output winding.

Referring to the drawings, the alternating current generator constructed in accordance with the present invention is shown as comprising three principal parts; namely, a rotor indicated generally at 10, a stator indicated generally at 11, and a toroidal output winding 12 supported by the stator and surrounding the rotor.

Figure 4:
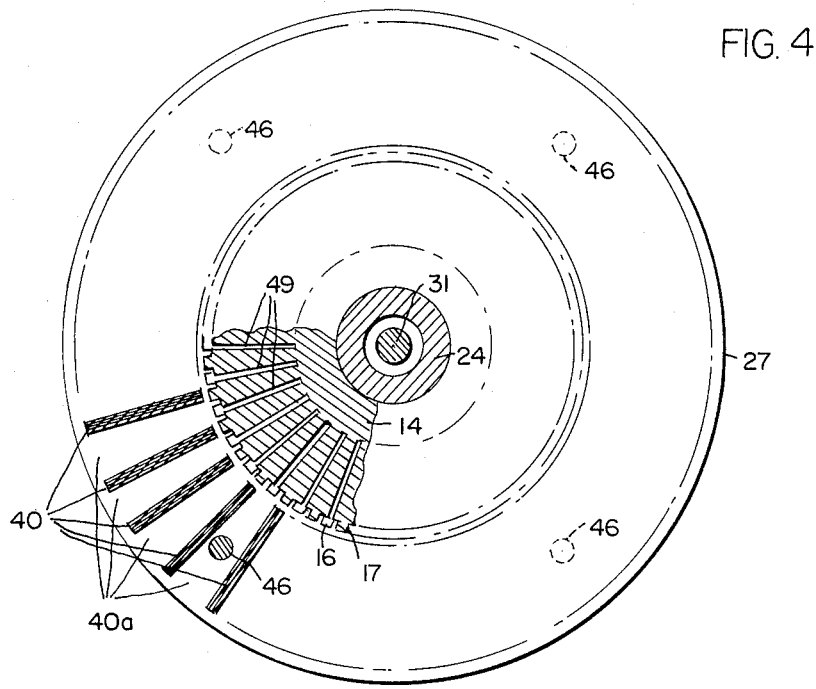
FIGURE 4 is a partial sectional view looking in the direction of the arrows 4—4 of FIGURE 1.
Figure 5:
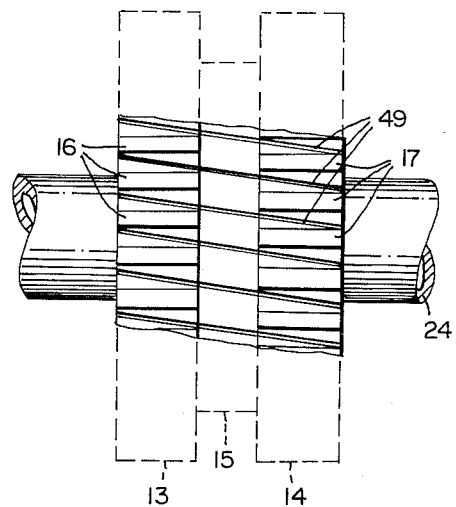
FIGURE 5 is a side view of a part of the generator rotor showing certain structural details.

For convenience in construction and assembly, the rotor 10 is shown as formed of three parts of a suitable magnetic material such as silicon steel, these parts being two toothed members 13 and 14 separated by a spacer member 15. As best shown in FIGURE 5, the member 13 is provided with a plurality of teeth 16 resembling square gear teeth. Similarly, the member 14 is also provided with similar teeth 17, the number of teeth on the members 13 and 14 being the same. In order to permit the rotor to perform a flux-switching action to be described, the teeth on the members 13 and 14 are staggered. Thus, when viewed axially as in FIGURE 4, it will be noted that the teeth 17 of the member 14 are displaced from the teeth 16 of the member 13 by an amount approximately equal to half of the pitch of the teeth so that the teeth of one of the members lie opposite to the space between the teeth of the other member.

Located on opposite ends of the rotor are two circular permanent magnets 18 and 19. The magnet 18 is annular in shape having a rim portion 20 and an inwardly projecting hub portion 21. Similarly, the magnet 19 has a rim portion 22 and an inwardly projecting hub portion 23. The rotor assembly arranged in the order named— that is, the magnet 18, the member 13, the spacer member 15, the member 14, and the magnet 19—are all provided central holes of the same diameter and are stacked in abutting relation on a hollow shaft 24 and are frictionally retained thereon as by a press fit with the teeth on the members 13 and 14 in the staggered position referred to above. The shaft 24 is rotatably mounted in cup-shaped portions 25 and 26 of stator end plates 27 and 28 by means of conventional radial ball bearings 29 and 30. The illustrated driving arrangement for the shaft 24 is similar to that commonly used in tachometer generators and comprises a flexible shaft 31 extending through the hollow shaft 24 and coupled to one end of the shaft 24 by means of a pin 32 which permits a limited amount of pivotal movement of the driving shaft 31 to avoid stresses that might be caused by misalignment between the generator drive shaft and the driving shaft to which it is coupled (not shown). The outer driving end of the shaft 31 projects beyond the end of plate 28 and has a squared end portion 33 adapted to be received in a square hole of a driving shaft, the entire generator being held on a suitable mounting pad by means of fastening bolts (not shown) extending from the end plate 28.

Figure 3:
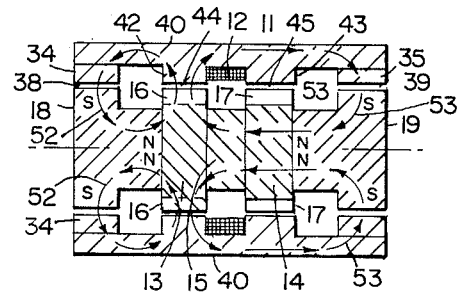
FIGURE 3 is similar to FIGURE 2 but with the generator rotor displaced from the position shown in FIGURE 2 to illustrate the changes in the direction of the magnetic flux paths.
Figure 1:
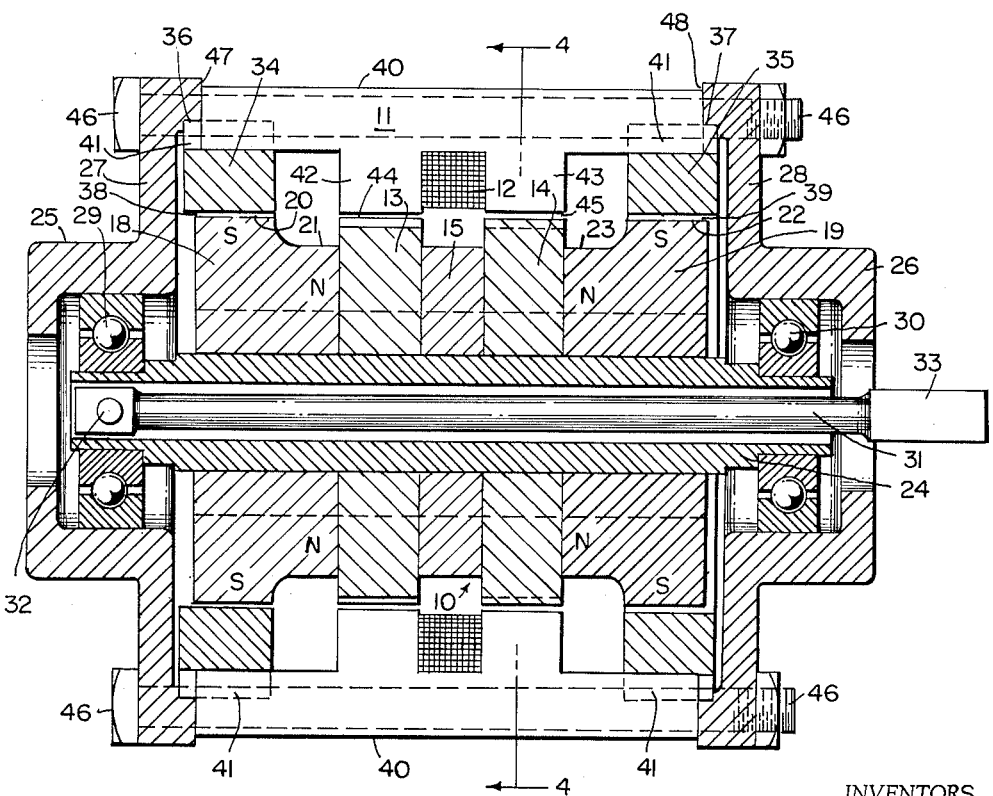
FIGURE 1 is a cross-sectional view of an alternating current generator constructed in accordance with the present invention.

The rotor magnets 18 and 19 which provide a magnetic field linking the output winding 12 in a manner to be described are polarized so that the hub portions 21 and 23 abutting the two rotor members 13 and 14 have the same polarity as indicated by the symbols N in FIGURES 1, 2 and 3 of the drawings. The radially projecting rim portions 20 and 22 of the magnets 18 and 19 have circular poles of the opposite polarity as indicated by the symbols S. The magnetic flux from the magnets 18 and 19 circulates through the magnetic structure of the stator 11 so as to link the output winding 12 as will now be described.

Disposed opposite the rim portions 20 and 22 of the magnets 18 and 19 are two axially spaced annular pole pieces 34 and 35 carried in grooves 36 and 37 and end plates 27 and 28. These pole pieces are formed of a suitable magnetic material such as silicon steel and are positioned so that the inner surfaces are spaced from the rim portions 20 and 22 of the magnets 18 and 19 by small air gaps 38 and 39.

Extending between the annular pole pieces 34 and 35 are a plurality of stator bars 40. These stator bars, which are preferably formed of stacked laminations or punchings as shown in FIGURE 4, have end portions which are received in a series of radial grooves 41 which are machined in the pole pieces 34 and 35 at regularly spaced intervals around the periphery thereof. Each stator bar has two axially aligned stator teeth 42 and 43 depending therefrom and axially positioned so as to lie opposite the teeth on the rotor members 13 and 14 from which they are spaced by air gaps 44 and 45. As shown, the output winding 12 is carried by the stator bars and is mounted between the stator teeth 42 and 43.

It will be understood that the number of stator bars is selected such that the number of pairs of stator teeth 42 and 43 correspond in number to the number of teeth on the rotor members 13 and 14 which have an equal number of teeth although they are staggered as pointed out above. The number of teeth determines the number of electrical cycles of the output voltage per revolution induced in the stator winding 12 which may be varied to obtain the desired frequency of the generator. As shown in FIGURE 4, the stator bars 40 have V-shaped openings 40a therebetween which facilitates removal of heat from the generator during operation by providing adequate ventilation. Also, the space between the stator bars may be conveniently used to bring out the leads from the output winding 12 which are connected to suitable terminals (not shown). The generator assembly is maintained in the assembled position shown by means of bolts 46 which draw together the end plates 27 and 28 and force flanges 47 and 48 projecting inwardly therefrom firmly against the end of the stator bars 40 thereby preventing axial movement thereof. Since the ends of the stator bars 40 fit snugly in the radial grooves 41 of the pole pieces and the pole pieces themselves are held firmly in the grooves 36 and 37 in the end plates, the entire assembly is firmly positioned to maintain the assembled parts in the proper operating relationship and maintains the desired clearance of the air gaps 38, 44, 45, and 39.

For the purpose of reducing eddy current losses in the rotor during operation of the generator, a plurality of slots 49 are preferably machined in the rotor. As shown in FIGURES 4 and 5 of the drawing, these slots are skewed slightly so that they may be machined in the rotor in the assembled position without cutting the staggered teeth on the rotor sections 13 and 14. A representation of the slots in FIGURE 1 has been omitted for clarity.

The stator bars 40 and the annular pole pieces 34 and 35, being formed of magnetic material, provide low reluctance return paths for the magnetic flux emanating from the rotor magnets 18 and 19 circulating between the rotor 10 and the stator 11. The common central portion of the return path is periodically switched between stator teeth 42 and 43 by the section of the staggered teeth 16 and 17 on rotor members 13 and 14. The paths for the magnetic flux from the magnets 18 and 19 are shown in FIGURES 2 and 3 to which reference will now be made for purposes of explanation.

In the position shown in FIGURE 2 (also FIGURE 1), the rotor 10 is positioned so that the teeth 17 of rotor member 14 are in alignment with teeth 43 of the stator bars 40. Since the teeth 16 of rotor member 13 are staggered, these teeth are out of alignment with stator teeth 42, and there is a relatively large air gap between these members having high magnetic reluctance. Therefore, the flux from the magnet 18 seeking the low reluctance path circulates in the path indicated by the arrows 50, and the flux from the magnet 19 circulates in the path indicated by the arrows 51. The flux from the magnet 18 as indicated by the arrows 50 may be traced as follows: north pole of magnet 18, rotor members 13, 15, and 14, teeth 17, air gap 45, stator bar 40, pole piece 34, air gap 38, and the south pole of magnet 18. In the same rotor position, the flux path from the magnet 19 as indicated by the arrows 51 may be traced as follows: north pole of magnet 19, rotor member 14, teeth 17, air gap 45, stator teeth 43, stator bar 40, pole piece 35, air gap 39, and the south pole of magnet 19. Thus it will be noted that the flux from rotor magnet 18, in circulating through the path indicated, links the output winding 12 in a counterclockwise direction whereas the flux from the rotor magnet 19 is bypassed around and does not link the output winding. When the rotor of the generator rotates an amount equal to half the pitch of the teeth on rotor members 13 and 14, the teeth 16 of rotor member 13 become aligned with stator teeth 42 so as to form a low reluctance magnetic path therebetween while the teeth 17 of rotor member 14 are moved out of alignment with the stator teeth 43 thereby creating a high reluctance magnetic path between these parts. When the rotor is in this position shown in FIGURE 2, the flux from the rotor magnet 18 circulates through a path indicated by arrows 52 which may be traced as follows: north pole of rotor magnet 18, rotor member 13, teeth 16, air gap 44, stator teeth 42, stator bar 40, pole piece 34, air gap 38, and the south pole of rotor magnet 18. In this same rotor position, the flux from rotor magnet 19 circulates in a path indicated by arrows 53 which may be traced as follows: north pole of magnet 19, rotor members 14, 15, and 13, teeth 16, air gap 44, stator bar 40, pole piece 35, air gap 39, and the south pole of rotor magnet 19. Thus it will be noted that in this position the flux from the rotor magnet 19 links the output winding 12 in a clockwise direction whereas the flux from rotor magnet 18 is bypassed around and does not link the output winding.

In view of the foregoing explanation, it will now be apparent that during rotation of the rotor 10 the magnetic flux from the rotor magnets 18 and 19 alternately links the output winding 12 in opposite directions due to the flux-switching action of the staggered rotor teeth; and because of this action, an output voltage is induced in the output winding 12 in accordance with the well-known laws of electrodynamics. Because the direction of the flux linking the rotor coil 12 is alternately reversed, the electrical output of the output winding 12 is more than twice as great as it would be if it were linked only by the flux emanating from one of the rotor magnets in which case the flux would alternately vary from a maximum value to approximately zero. Actually in a case where only one rotor magnet is used, the flux linking the output coil will not collapse completely to zero because of several factors tending to maintain the flux which are (1) current in the output winding, (2) retentivity of the magnetic structures linking the permanent magnets, and (3) leakage flux in the air gaps. With the arrangement of the present invention, the flux linking the coil is periodically forced to reverse its direction by the action of switching the flux from the two magnets so as to reverse the direction of the flux linking the output winding. It is to be noted, also, that, while the use of a second permanent magnet on the rotor more than doubles the electrical output of the output winding, it does not require duplication of magnetic structure. The reason for this is the fact that a generator constructed in accordance with the illustrated embodiment of this invention has the advantage that the stator bars 40 provide magnetic circuit paths parts of which are common to both magnets thereby making possible a generator with a substantially higher power-to-weight ratio.

It will be understood that for a given speed of operation the frequency output of the generator may be changed by varying the number of teeth on the rotor members 13 and 14. Since the flux threading the output winding 12 makes a complete reversal during the time required for the rotor to rotate an amount equal to the pitch of the rotor teeth, it will be apparent that the frequency of the output voltage induced in the output winding 12 will be the number of rotor teeth multiplied by the number of revolutions of the rotor per unit of time. Thus, for example, if the generator rotor has 36 teeth and has a normal operating speed of 4200 revolutions per minute, the frequency of the output voltage of the generator will be 2520 cycles per second.

A developmental sample of an alternating current generator having the following specifications has been built and successfully operated, this data being included to show the high power-to-weight ratio obtainable with this invention.

| Electromagnetic dimensions | 2½" diameter. 1¾" length. |
|---|---|
| Operating speed range | 2,100–4,200 r.p.m. |
| Number of rotor teeth | 36. |
| Frequency | 36 cycles per revolution. |
| Power output over 2,100 to 4,200 r.p.m. speed range | 50 watts delivered to a 175 ohm, single-phase load with 0.33 m.f.d. capacitor in series with a load. |
| Voltage across load over rated speed range of 2,100–4,200 r.p.m. | 111 volts to 97 volts. |
| Harmonic distortion | None perceptible on oscilloscope. |

It will be understood that this invention is not limited to an arrangement wherein the two magnets providing the flux linking the output coil are mounted on the generator rotor. The magnets may, for example, be fixed to the stator and located so as to be in circuit with the magnetic flux paths described above. For example, the pole pieces 34 and 35 may be formed of permanent magnet material and polarized so as to have opposite poles adjacent the stator bars 40 and the air gaps 38 and 39. In this case the rotor of the generator performs only the flux-switching action causing the flux from the two magnets alternately to link the output winding 12. Also, the magnets may be electromagnets excited from the output of the output winding.

An important advantage of the present invention, in addition to the higher power-to-weight ratio obtainable, is the fact that the generator construction lends itself easily to the generation of high electrical frequencies of the order of several thousand cycles per second with a reasonable number of teeth on the rotor. Thus, in the example cited above, for a generator having 36 rotor teeth and driven at 4200 r.p.m., the output frequency is 2520 cycles per second. Such a high output frequency obtainable with this relatively simple mechanical structure is advantageous in many applications requiring rectification of the alternating output current of the generator in that the high frequency permits the use of much smaller size filter capacitors required to reduce the ripple in the rectified output to acceptable levels.

The still further advantages of simple mechanical and electrical design of the generator will now be apparent from the foregoing description of the constructional details from which it is noted that the various parts have relatively simple configurations which are easy to machine. It will also be noted that the parts are symmetrical, thereby facilitating dynamic balance and assembly.

While there have been described what are at present considered to be the preferred embodiments of the invention, it will be apparent to those skilled in the art that various changes and modifications may be made therein without departing from the spirit or scope of the invention.

What we claim as new and desire to secure by Letters Patent of the United States is:

1. An alternating current generator comprising a rotor of magnetic material having two sets of spaced, staggered teeth and a circular permanent magnet adjacent each end of the rotor with like poles adjacent the rotor teeth, stator structure of magnetic material comprising two axially spaced annular pole pieces, one of the pole pieces surrounding each rotor magnet and lying adjacent one of the poles thereof, and a plurality of stator bars extending between the pole pieces and disposed around the periphery of the pole pieces, each stator bar having a pair of axially aligned, spaced teeth, the number of stator bars corresponding to the number of teeth on each set of rotor teeth and each set of peripherally disposed stator teeth lying radially opposite and corresponding to each set of rotor teeth, and an output winding surrounding the rotor and disposed between the two sets of stator teeth.

2. An alternating current generator as set forth in claim 1 wherein each stator bar comprises a series of stacked laminations supported in radially extending grooves in the annular pole pieces.

3. An alternating current generator as set forth in claim 1 wherein the rotor has a series of radially extending slots between the rotor teeth to reduce eddy current losses in the rotor.

References Cited by the Examiner

UNITED STATES PATENTS 2,760,093   8/1956   Button _____ 310—156 X

FOREIGN PATENTS 536,658   5/1941   Great Britain.
595,003   4/1959   Italy.

References Cited by the Applicant

UNITED STATES PATENTS 2,651,734   9/1953   Field.

MILTON O. HIRSHFIELD, *Primary Examiner.*